United States Patent
Abe

[11] 3,945,739
[45] Mar. 23, 1976

[54] BALL JOINT

[75] Inventor: Michio Abe, Kasugai, Japan

[73] Assignee: Tokai TRW & Co., Ltd., Kasugai, Japan

[22] Filed: Nov. 25, 1974

[21] Appl. No.: 527,060

[30] Foreign Application Priority Data
Nov. 29, 1973 Japan.............................. 48-133033

[52] U.S. Cl................................ 403/138; 403/144
[51] Int. Cl.² ........................................ F16C 11/06
[58] Field of Search .......... 403/138, 136, 144, 135, 403/133, 139, 140, 134, 137, 132, 122, 126, 125, 124, 127, 128, 129, 130, 131

[56] References Cited
UNITED STATES PATENTS

| | | | |
|---|---|---|---|
| 2,848,260 | 8/1958 | Moskovitz | 403/126 |
| 3,154,333 | 10/1964 | Townsend | 403/122 |
| 3,226,141 | 12/1965 | Sullivan, Jr. | 403/135 |
| 3,376,058 | 4/1968 | Herbenar | 403/126 |
| 3,389,927 | 6/1968 | Herbenar | 403/128 |
| 3,647,249 | 3/1972 | Baba et al. | 403/140 |
| 3,790,195 | 2/1974 | Herbenar | 403/124 |

FOREIGN PATENTS OR APPLICATIONS

| | | | |
|---|---|---|---|
| 816,567 | 7/1959 | United Kingdom | 403/130 |
| 1,087,019 | 8/1960 | Germany | |

Primary Examiner—Andrew V. Kundrat
Attorney, Agent, or Firm—James E. Nilles

[57] ABSTRACT

A ball joint which comprises a metallic housing, a resilient bearing of polymer disposed in said housing, a ball stud having a metallic spherical member rotatably supported by said bearing, and at least one resilient metallic closure plate so secured as to close an open end of said housing for applying pre-load to said bearing, and the spherical member is at its annular surfaces opposed to the opposite open ends of the housing and a depression in the closure plate with a slight clearance or under a light contact pressure but being elastically in contact with the bearing between the annular surfaces.

3 Claims, 8 Drawing Figures

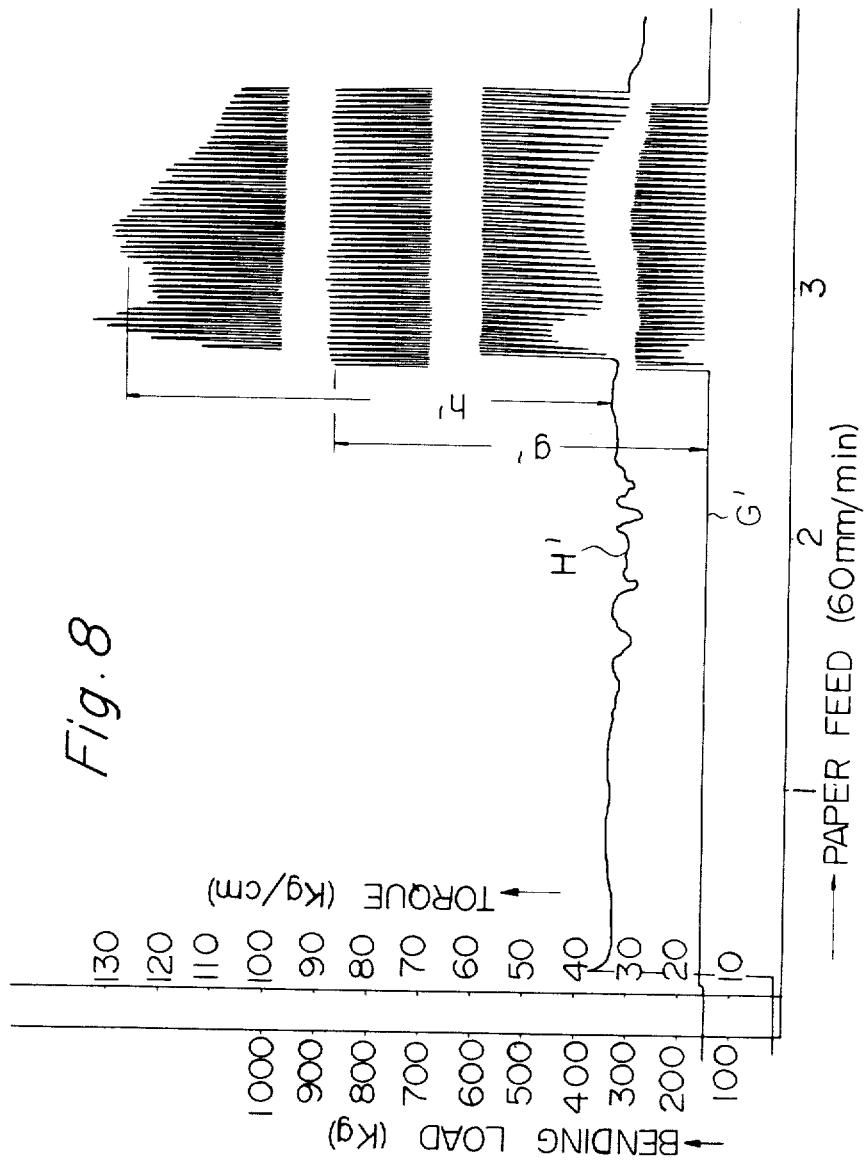

ial and oscillative torque.
BALL JOINT

BACKGROUND OF THE INVENTION

This invention relates to an improvement on a ball joint, and more particularly to a heat resisting ball joint used in automotive steering and suspension systems for vehicles.

In general, a ball joint in which a spherical member or ball element for a ball stud is held in a preloaded condition within a resilient bearing accommodated in a housing, has been well known to the art.

A ball joint of this class heretofore found has been of one type, as typically disclosed in U.S. Pats. Nos. 2701151 or 2823055, that is a so-called "steel on steel" in which a bearing consists of a plurality of metallic elements or sintered alloy elements, and of the other type, as typically shown in U.S. Pat. Nos. 3073634, 3363921, and 3413023, that is a so-called "polymeric lined" in which a bearing consists of a single or plurality of synthetic resin or rubber members.

In a ball joint of the steel-on-steel type, it is practical to employ a coil spring and a specific metal hardening treatment in combination with a grease nipple for lubrication in order to compensate for wear on a contact surface or to relieve impact since such a ball joint construction will require a contact between a spherical member of ball element for stud and a bearing, namely, metal and metal. Although such construction is solid and durable, it requires complicated component.

A ball joint of the polymeric-lined type has proven satisfactory, and it eliminates not only the coil spring used for wear compensation and impact relief but also the need for a grease nipple, because the permanently lubricating structure of a ball joint using synthetic resin, rubber and a bearing structure properly preloaded has a low fiction coefficient. However, this type of ball joint is inferior to a metallic structure in rigidity, durability, and heat resistance.

Ball joints are subjected to critical environment conditions. For instance, ball joints for steering or suspension systems arranged adjacent the highly heated zone which is composed of a thermal reactor and catalyzer in the exhaust line of a non-pollution car engine are heated to a temperature of 120° – 130°C. Under this condition, ball joints which rely on contact between metals tend to run out of lubricant or the lubricant deteriorates and then the bearing surface becomes seizured when the dust cover is subjected to a high temperature or damage due to any other reason. This is entirely because of the structure which is adapted to distribute the lubricant between the dust cover and the bearing surface.

On the other hand a ball joint bearing of synthetic resin or rubber is lower in resistance to heat, and if such a ball joint is subjected to a high temperature, it softens and is deformed or melts and flows out of the space between the metal housing and ball stud spherical member or ball element to lessen the pre-load on the bearing.

SUMMARY OF THE INVENTION

Therefore, it is a principal object of this invention to provide a ball joint simple in construction which is rigid and durable and is capable of maintaining the desired function even if subjected to critical conditions.

Another object of the invention is to provide a ball joint which is resistant to high heat and maintains rotational and oscillative torque.

Another object of the invention is to provide a ball joint wherein the spherical member of a ball stud is supported by at least one resilient metallic closure plate and a metallic housing and has high resistance to excessive impact force so that the polymeric bearing cannot be destroyed.

Another object of the invention is to provide a ball joint wherein the entire surface of the polymeric bearing is sealed substantially with the metallic housing and the closure plate, and the thermal expansion of the polymeric bearing is absorbed by the elasticity of the closure plate, whereby the polymeric bearing is prevented from flowing out of the housing openings or any other clearance thus minimizing variation in internal pressure of the bearing.

In a preferred embodiment of the invention, the resilient metallic closure plate has a central depression which is at its annular openings edge in contact with one end of the spherical member. The closure plate supports elastically the polymeric bearing and is secured to the housing. The other end of the spherical member is in contact with the housing, thus the entire surface of the bearing is sealed substantially.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the invention in any way.

BRIEF DESCRIPTION OF THE DRAWINGS

FIGS. 7 and 8 are oscillograms showing torque fluctuation against load fluctuation.

PREFERRED EMBODIMENT OF THE INVENTION

Figure 1:
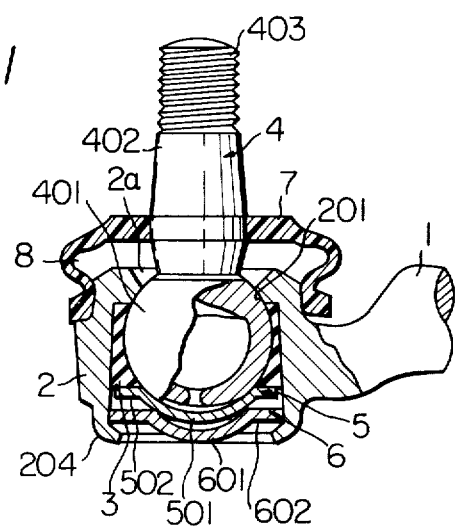
FIG. 1 is a vertical sectional view of a ball joint constructed according to the invention.

Reference is made to the accompanying drawings and, more particularly, to FIG. 1 thereof in which a ball joint of the invention used in motor vehicle steering system linkages is shown. The ball joint comprises a housing 2 of metal formed at the end of a stem 1 which is connected to a steering system tie rod, a resilient and compressible bearing 3 of polymer encased in the housing, a ball stud 4 of metal having a ball element 401 rotatably mounted and supported in the bearing. The ball element 401 is hollow and the bottom center thereof is open ended. The housing is provided with an opening 2a at the upper end thereof through which a shank 402 of the ball stud 4 passes, and an open end at the lower end thereof. The shank 402 includes a threaded end 403 at the upper end thereof for the purpose of connection with a suitable link (not shown).

In the illustrated embodiment, the open end of the housing 2 is closed by two closure plates 5 and 6. The closure plates 5 and 6 are formed with downwardly concave portions 501 and 601 at the centers thereof to conform to the contour of the spherical surface of the ball element 401.

The inner closure plate 5 is resilient enough to have the rim of the concave portion 501 and an annular flange 502 thereof circumferentially in contact with the ball element 401 and the bearing, respectively to apply the pre-load thereto. The outer closure plate 6 is so adapted that the rim of the concave portion 601 will support the inner closure plate 5, and is held against the housing in such a manner that the rim 204 of the housing 2 is inwardly drawn to engage an annular flange 602 with the housing. The bearing 3 is thus subjected to pre-load by the inner wall of the housing 2, the inner closure plate 5, and the ball element 401. A dust cover 7 is sealed to the ball stud shank 402 and secured to the housing at the periphery thereof to define a sealed grease chamber 8.

Figure 2:
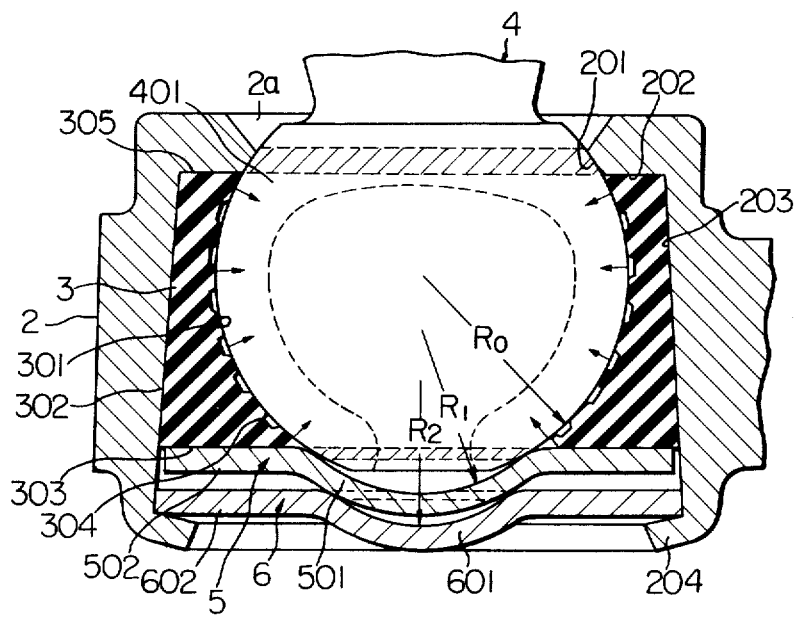
FIG. 2 is an enlarged fragmentary sectional view showing a main portion of the ball joint shown in FIG. 1.

In FIG. 2, the ball joint is shown in larger scale for the purpose of better visual illustration. As shown, the ball element 401 is in contact with the inner face 201 of the housing opening 2 in a metal-to-metal relation and engages with the bearing 3 in a metal-to-polymer relation. The ball element 401 comes into contact with the rim of the concave portion 501 of the inner closure plate in a metal-to-metal relation.

The bearing 3 is a one-piece structure in the shape of a truncated hollow cone but provided with a spherical surface portion 301. The dimensions of the bearing 3 are such that in a normal condition, the space defined by the spherical surface portion 301 of the bearing is of the same diameter as the diameter $R_o$ of the ball element 401 whereas a conical surface 302 of the bearing 3 can be inserted into the lower open end of the housing along with the inner surface 203 thereof but a shoulder portion 305 of the bearing is spaced away from a downwardly facing marginal portion 202 with the clearance of 0.1 – 0.5 mm therebetween when pre-load of about 200 kg is applied to assemble the ball joint. The upper and lower open ends of the bearing are so dimensioned as to provide an oil tight fit between the bearing and the ball element. The height of the bearing is so dimensioned as to provide a clearance of 0.5 – 1.0 mm between the concave portion 501 and the ball element 401, which is somewhat larger than the clearance between the shoulder portion 305 and the marginal portion 202 when the upper closure plate 5 abuts against the bearing at the bottom end thereof. The bearing 3 is provided with two or more isolated recesses 304 at the inner spherical surface 301 thereof to retain lubricant in the recesses.

The inner closure plate 5 is so dimensioned that a radius $R_1$ of the sphere defined by its concave portion 501 is less than the radius $R_o$ of the ball element 401, and the outer diameter of the annular flange 502 is so determined as not to reach the housing inner wall surface. On the other hand, the outer closure plate 6 is so dimensioned that a radius $R_2$ of the sphere defined by its concave portion 601 is substantially the same as the radius $R_1$, and the outer diameter of the annular flange 602 is somewhat larger than that of the annular flange 502 but provides a firm seal condition when the rim or bottom member 204 of the housing 2 is inwardly drawn.

In assembling the components into the ball joint, the ball element 401 for the ball stud 4 is forced into the upper open end of the bearing to form a ball stud and bearing assembly after lubricants such as high heat grease or wax are applied to the inner spherical surface of the bearing 3. This assembly is then mounted within the housing 2. The inner and outer closure plates 5 and 6 are disposed to cover the assembly. The outer closure plate 5 is urged under pre-load of about 200 kg until the two plates assume positions as shown in FIG. 3 to establish the appropriate clearances between the components.

The clearance (first clearance) between the marginal portion 202 of the housing and the shoulder portion 305 of the bearing is 0.1 – 0.5 mm as previously mentioned and the radial clearance (second clearance) between the annular neck portion 201 in the housing opening 2a and the ball element 401 is also 0.1 – 0.5 mm. It is apparent therefrom that the axial clearance (in parallel with the Y axis) between the annular neck portion 201 and the ball element 401 resulted from the second clearance and is larger than the first clearance. The clearance between the concave portion 501 of the inner closure plate 5 and the ball element 401 is 0.5 – 1.0 mm, larger than the first clearance. The inner and outer closure plates 5 and 6 are so arranged that the two concave portions 501 and 601 are in contact with each other. The bearing is held between the housing and the ball element in such a manner that its inner spherical surface 301 is in contact with the ball element sphere whereas its conical surface 302 abuts against the inner wall surface 203 of the housing.

Figure 3:
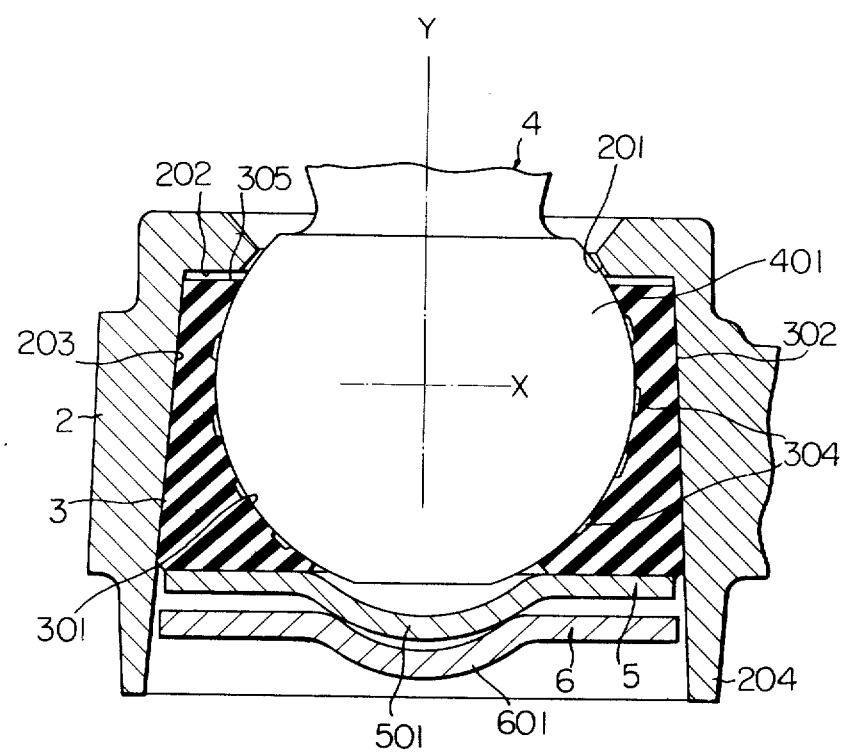
FIG. 3 is a view similar to FIG. 2 but showing the ball joint during assembly.

Now the outer closure plate 6 in a position shown in FIG. 3 is upwardly urged in the direction of Y axis, and the bearing is forced into the housing while inwardly compressed by the inner wall surface of the housing until the shoulder portion 305 of the bearing abuts against the marginal portion 202 of the housing. At this moment, the bearing surface or annular neck portion 201 faces the ball element sphere with substantially no space or is in contact with the ball element surface with minimum pressure. At this stage, the concave portion 501 of the inner closure plate 5 may withstand most of pressure due to its springy or resilient action. When the components of the ball joint are brought into the stage as aforementioned, further pressure is thus prevented from being applied. The bottom housing member 204 is then inwardly bent or drawn by a conventional spinning process to hold the outer closure plate 6 in position within the housing thereby assembling the component into the ball joint as shown in FIG. 2 wherein the bearing provides uniform internal stresses directed to the center of the ball element, as indicated by arrows of FIG. 2 to satisfactorily hold the ball element with a proper resilient force. Thus, a complete lubrication between the ball element surface and the bearing is ensured with the lubricant being pressurized in the isolated and individual recesses 304 formed in the inner spherical surface of the bearing.

As a specific example of an embodiment of the invention, the ball joint shown in the drawing has the following dimensions:

| component | principal dimension | treatment | quality standard |
|---|---|---|---|
| ball stud (hollow ball stud) | diameter: 24mmφ | rolling finish on ball portion after hardening and tempering | JIS SCM-21 |
| bearing (isolated lubricant) receiving recess type) | inside diameter: 24mmφ<br>outer diameter (minimum: 27mmφ)<br>         (maximum: 29mmφ)<br>height: 15mm<br>upper open end: 21mmφ<br>bottom open end: 16mmφ | | high density polyethylene |
| housing | outer diameter: about 40mmφ<br>inner face (upper minimum): 19mmφ<br>         (bottom maximum): 21mmφ<br><br>(complementary to bearing in truncated form) | hardening and tempering<br>Note: Wall surface of opening is spherical surface of 24φ | (JIS) S 40C |
| inner closure plate | outer diameter: 28mmφ<br>circular concave diameter: 20mmφ<br>inner diameter (maximum): 16mmφ<br>thickness: 1.2mm | hardening and tempering | (JIS) S 60C |
| outer closure plate | outer diameter: 29mmφ<br>thickness: 2.4mmφ<br>concave portion in the same form as the inner closure plate | | (JIS) S 15C |
| pressure applied | 1,000kg | | |

The working characteristics of the ball joint constructed according to the present invention will be apparent from the following description.

Ball joints for motor vehicle steering or suspension systems but not used as inner joint for rack and pinion steering systems are normally subjected to a lateral load in the direction of Y axis as shown in FIG. 3.

The ball joint constructed according to the present invention is so designed that the polymeric bearing the entire surface of which is compressed holds the ball element of the ball stud in place under the uniform stresses directed from entire spheric contact surface to the center thereof, and the bearing withstands most of the lateral load. For this reason, the ball joint provides good impact dissipation and maintains a rotational and oscillative torque to a proper extent. Even when the polymeric bearing can not withstand the lateral and longitudinal loads from impact exerted thereon when the car is subjected to a rough road or a sharp turn, the polymeric bearing cannot be destroyed and has high resistance to excessive impact force since contact stresses at two metal-to-metal contact surfaces as mentioned hereinbefore are increased with a stress counting for nothing or little in normal running. In other words, these contact stresses at the metal-to-metal contact surfaces are the remaining portion of the external forces a part of which is absorbed in the bearing. Accordingly, the seizing of bearing surface which is common in a conventional ball joint with a metal on metal bearing structure, is eliminated. Lubrication is critical to prevent deterioration where the ball joint is used at high temperature. However, the ball joint of the present invention enables the metal to metal bearing surface to exhibit sufficient resistance to heat due to metal contact stress.

A disadvantage in a conventional ball joint with a single or composite polymeric bearing is that polymer material when subjected to a high temperature of 120°C and excessive impact external force, is softened and when it exceeds its elastic limit flows out of the housing openings or any other clearance thereby involving permanent deformation of the bearing surface to result in loss of pre-load. As a result, the ball joint becomes loose or wobbly and thus is of no more use due to lack of rotational and oscillatory torque.

In contrast, the ball joint of the present invention is adapted to seal substantially the entire surface of the polymeric bearing with the metallic housing and the closure plates, and to allow the resiliency inherent in the inner closure plate to absorb the expansion ratio of the polymeric bearing if subjected to a high temperature of 120°C and thermally expanded, thus minimizing variation in its internal pressure but to have the ball stud metallically contacted with the housing contact surface inner face if the bearing material is about to exceed its elastic limit by excessive external force. With this arrangment, the polymeric bearing is not deformed. The polymeric bearing of the invention, even if subjected to great external force and high temperature, is capable of keeping the internal force within range of elastic limit of the bearing while maintaining the predetermined oscillatory and rotational torque, impact dissipation, permanent lubrication inevitably required by the ball joint. The ball joint relies on the use of not only the hollow ball stud as described to serve for relieving stress but also on the polymeric bearing with isolated lubricant receiving recesses at the contact surface respect to the spherical member of the ball stud to improve performance characteristic of the ball joint.

The following results were obtained from various tests made by the inventor during the period extending from 1972 to the present for the purpose of comparing the ball joints of the present invention with those of the prior art, made of the same materials.

Table 1 below is comparative data showing turning torque and durability of the ball joints of the present invention and the prior art, these bearings being made of high density polyethylene, Delrin, and nylon, wherein A, B, and C modes are in the test forms as mentioned hereinafter.

A mode: A unidirectional static bending load of 500 Kg is applied to the housing at one side thereof whereas a resultant motion composed of rotation of an angle of ±30° and a swing with an angle of ±15° is exerted on the ball stud at a speed of 300 c.p.m. for 1 × 10⁶ cycles.

B mode: The resultant motion as in A mode is applied to the ball joint at a speed of 72 c.p.m. for 1 × 10 cycles. Bending loads for one cycle are applied in the following manner as illustrated.

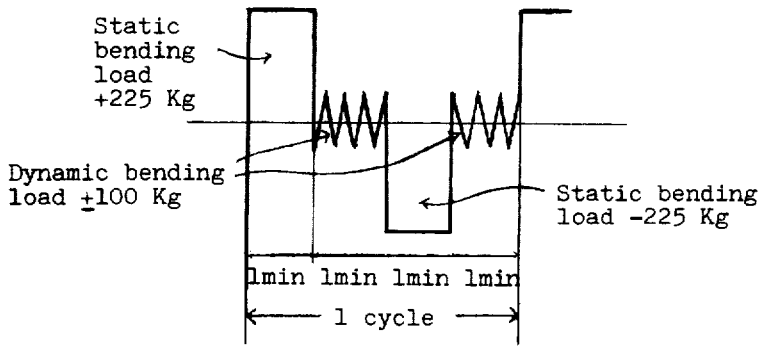

Note: A dynamic bending load is given at a speed of 230 c.p.m. According to B mode, muddy water which contains 50% salt is applied to the contact or wiping surfaces of the bearing and ball element once for ten minutes.

C mode: This mode is carried out at a high temperature instead of at room temperature as in B mode and is substantially similar to B mode with exception of no application of muddy water containing salt as in B mode.

As best shown in Table 1, it is understood that any of the ball joints in accordance with the present invention provides less torque-up as compared with load-up at either room temperature or high temperature as compared with any of conventional ball joints. This will show an excellent drive-parking characteristic. The ball joint of the present invention proves to withstand a severe test at temperatures ranging from 120° to 150°C thereby leading to satisfactory results when used in a vehicle as opposed to the conventional ball joints most of which are no longer used under an endurance test at a high temperature.

Table 2 below shows a characteristic of material for the bearing used in the aformentioned test, wherein Teflon is added to polyamide nylon and polyacetal Delrin.

Figure 4:
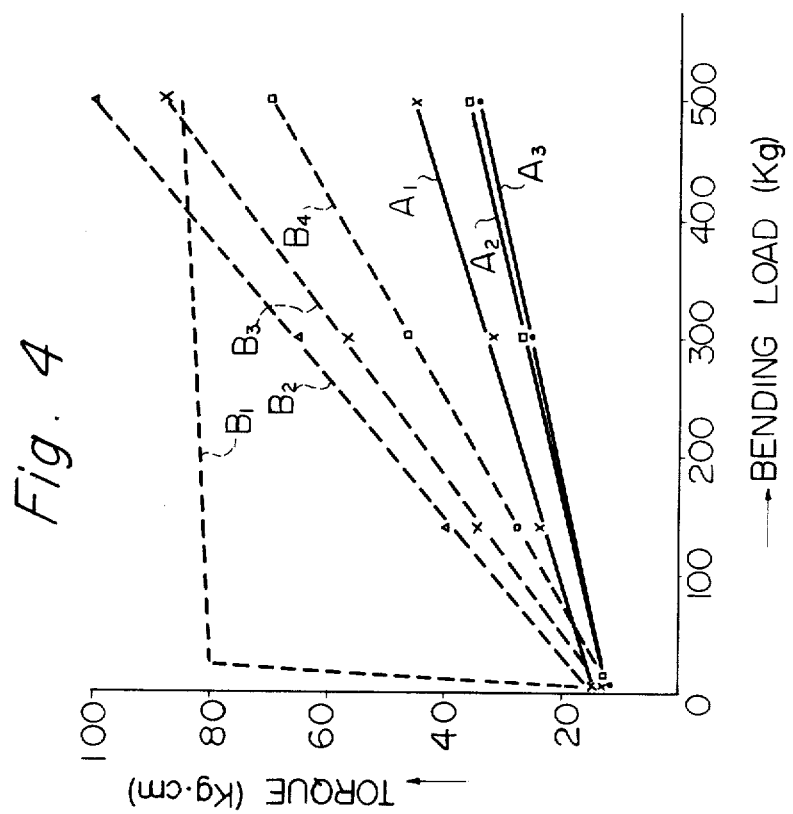
FIG. 4 is a graph showing a stationship between compressive load and torque.

FIG. 4 is a graph showing a relationship between compressive load and torque, wherein lines $A_1$, $A_2$, and $A_3$ representing the present ball joint are shown as solid lines whereas $B_1$, $B_2$, $B_3$, and $B_4$ representing the conventional ball joints are shown as broken lines. More specifically, $A_1$ is the bearing integrally formed of Delrin, $A_2$ being the bearing integrally formed of nylon, and $A_3$ being the bearing integrally formed of polyethylene whereas $B_1$ is the bearing integrally formed of Delrin, $B_2$ being the metal bearing, $B_3$ being the two-piece bearing of Delrin, and $B_4$ being the bearing with edge of nylon. It is apparent from FIG. 4 how highly efficient the present ball joint is.

Figure 5:
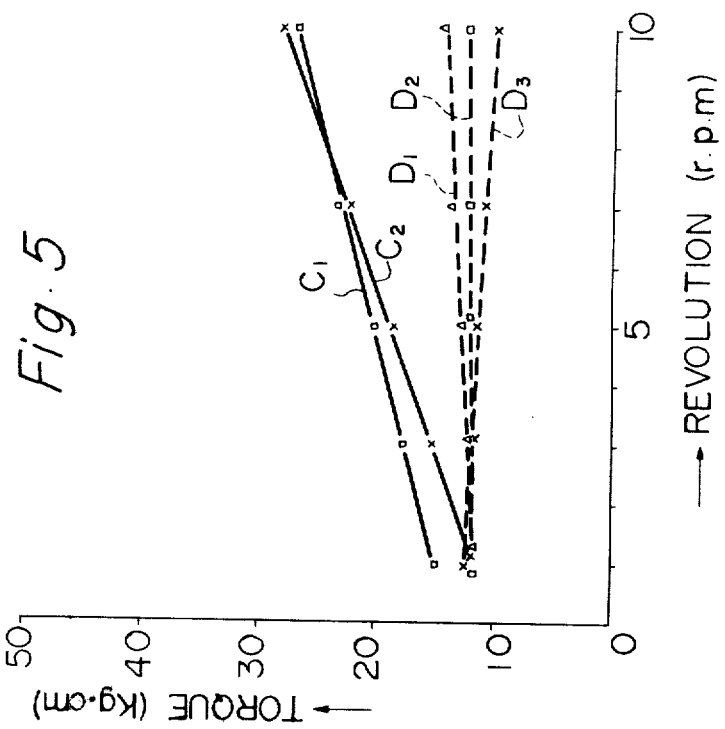
FIG. 5 is a graph showing torque variations against rotational speeds for a ball stud when unloaded.

FIG. 5 is a graph showing torque variations against rotational speeds for the ball stud when unloaded, wherein curves $C_1$ and $C_2$ representing the present ball joints are shown as solid lines whereas $D_1$, $D_2$, $D_3$ and $D_4$ representing the conventional ball joints are shown as broken lines. Stated specifically, $C_1$ is the bearing integrally formed of nylon, $C_2$ being the bearing integrally formed of Delrin whereas $D_1$ is the metal bearing, $D_2$ being the bearing with wedge formed of nylon, $D_3$ being the two-piece bearing formed of Delrin. It is obvious from FIG. 5 that torque may efficiently act according to increase in revolution.

Figure 6:
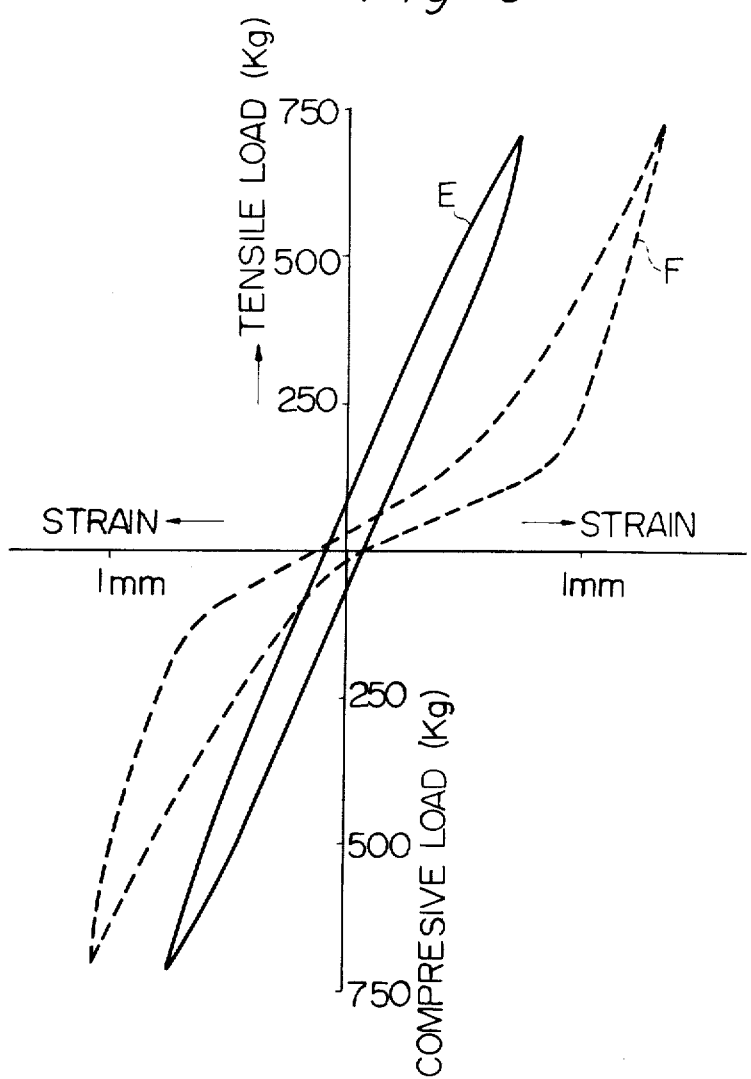
FIG. 6 is a graph showing a relationship between load and strain.

FIG. 6 is a graph comparing the present ball joint with the bearing integrally formed therewith and the conventional ball joint with two-piece bearing in effect thereof on the load strain, wherein curve E represents the present ball joint and Curve F shows the conventional ball joint. The ball joint of the present invention provides less strain against tensile and compressive loads thereby prolonging its shelf time.

Figure 7:
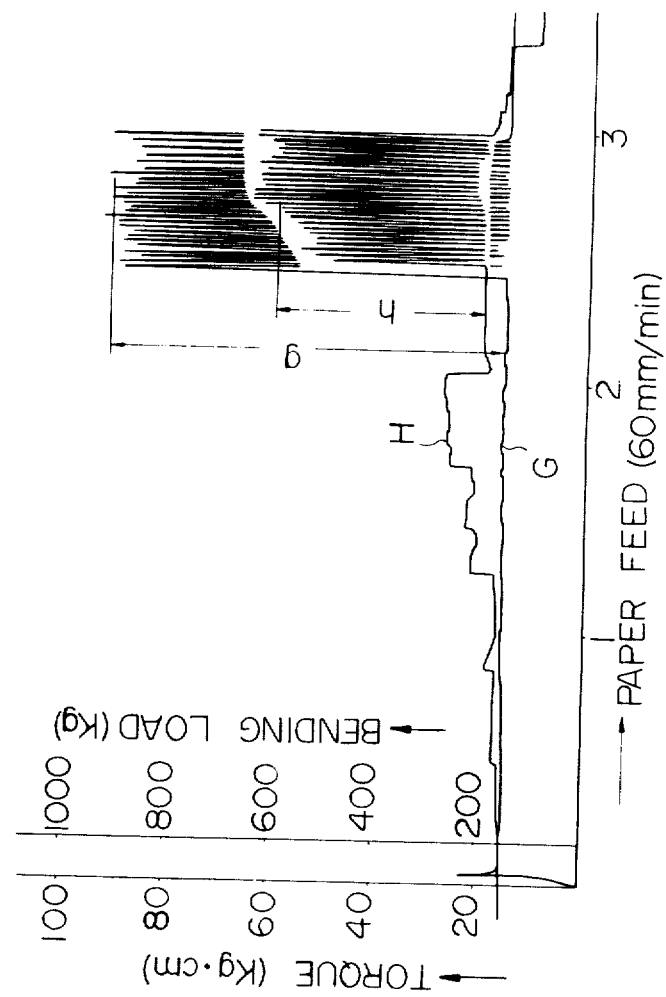

FIGS. 7 and 8 are oscillograms showing torque fluctuation against load fluctuation for comparison between the present ball joint of nylon and the conventional ball joint with two-piece bearing of Delrin. In FIG. 7, there is shown a characteristic of the present ball joint, wherein curve G represents bending load and variation in torque curve H is shown along with $h$ when bending load is varied in a given width $g$. In FIG. 8, there is shown a characteristic of the conventional ball joint, wherein torque curve H' is varied along with $h'$ when bending load G' is varied in width substantially equal to the width $g$ shown in FIG. 7.

As is apparent from FIGS. 7 and 8, the present ball joint provides less variation in torque as compared with that in bending load.

In the illustrative embodiment described above, although the resilient annular flange of the inner closure plate is in a planer form, it may be in a corrugated form. If necessary, the outer closure plate may be omitted.

Table 1

| Test items and conditions | Materials of bearing | | Type | High density polyethylene | | | |
|---|---|---|---|---|---|---|---|
| | | | | Conventional pre cap | | Present invention | |
| | | | | Torque (kg/cm) | Torque up (%) | Torque (kg/cm) | Torque up (%) |
| | Room temper- | | 0 | 10 | 0 | 12 | 0 |
| | | Load | 140 kg | 14 | +40 | 25 | +108 |

Table 1-continued

| Test items and conditions | | Materials of bearing | | | High density polyethylene | | | |
|---|---|---|---|---|---|---|---|---|
| | | | Type | | Conventional pre cap | | Present invention | |
| | | | | | Torque (kg/cm) | Torque up (%) | Torque (kg/cm) | Torque up (%) |
| Turning Torque | | ature | | 550 kg | 23 | +130 | 35 | +192 |
| | | | | 70°C | 40 | | 41 | 0 |
| | High temper- ature | No load | | 100°C | Failure | | 45 | +10 |
| | | | | 120°C | No test | | 50 | +22 |
| | | | | 140°C | " | | Failure | |
| | | | | 150°C | " | | No test | |
| Test Mode | | | Load | 140°C 550 kg | " | | " | |
| | Room temper- ature | | A mode Torque down (%) | | OK 10 → 3 | −70 | OK 12 → 4 | −67 |
| | | | B mode | | OK | | OK | |
| | | | Torque down (%) | | 10 → 2 | −80 | 12 → 4 | −67 |
| Dura- bility | High temper- ature | | | 120°C | | | 12 → 3 | −75 |
| | | | | 130°C | | | Failure | |
| | | | | 150°C | | | No test | |
| | | | | 140°C | | | " | |
| | | | | 150°C | | | " | |

| Delrin | | | | Nylon | | | |
|---|---|---|---|---|---|---|---|
| Conventional two-piece bearing | | Present invention | | Conventional two-piece bearing | | Present invention | |
| Torque (kg/cm) | Torque up (%) | Torque (kg/cm) | Torque up (%) | Torque (kg/cm) | Torque up (%) | Torque (kg/cm) | Torque up (%) |
| 12 | 0 | 15 | 0 | 12 | 0 | 13 | 0 |
| 35 | +192 | 22 | +46 | 20 | +67 | 17 | +31 |
| 84 | +600 | 30 | +100 | 78 | +550 | 25 | +92 |
| | | | | 20 | 0 | | |
| | | | | 60 | +200 | | |
| | | | | 100 | +400 | | |
| 10 | 0 | 15 | 0 | Failure | | 26 | 0 |
| 7 | −30 | 12 | −20 | No Test | | 30 | +15 |
| Failure | | 15 → 25 | +67 | " | | 13 → 35 | +170 |
| OK 12 → 3 | −75 | OK 15 → 6 | −60 | OK 12 → 2 | −83 | OK 13 → 8 | −38 |
| OK 12 → 2 | −83 | OK 15 → 6 | −60 | OK 12 → 2 | −83 | OK 13 → 5 | −61 |
| Failure | | 15 → 3 | −80 | Failure | | 13 → 3 | −77 |
| No test | | 15 → 2 | −87 | No test | | 13 → 2 | −85 |
| " | | 15 → 2 | −87 | " | | 13 → 2 | −85 |
| " | | Failure | | " | | 13 → 2 | −85 |

Table 2

| | unit | ASTM | polyamide nylon (11XP) | polyacetal delrin (11AP) | polyethylene (MARLEX 5003) |
|---|---|---|---|---|---|
| Tensile strength | kg/cm² | D-638 | 600~320 | 500 | 224 |
| Elongation | % | D-638 | 5 | 10 | 500 |
| Tensile elastic modulus | kg/cm² | D-747 | 28800 | 27000 | 10500 |
| Compression strength 1% deformation | kg/cm² | D-695 | 160 | 200 | 32 |
| 10% deformation | kg/cm² | D-695 | 600 | 800 | 170 |
| Bending strength (5% deformation) | kg/cm² | D-790 | 800 | 700 | 98 |
| Hardness | | D-785 | Rockwell R113 | Rockwell R114 | Shore-P 66 |
| Impact (with Izod notch) | kg.cm/cm | D-256 | 2.7~13.5 | 4.8 | 10.9 |
| Specific weight | | D-792 | 1.22 | 1.50 | 0.948 |
| Water absorption capacity | % | D-570 | 3.0 | 0.10 | — |
| Temperature of thermal deformation | °C (18.6 kg) | D-648 | 73 | 100 | 45 |
| Melting point | °C | | 205 | 175 | 121 |

What is claimed is:

1. A ball joint comprising a metallic housing having opposed first and second openings, a resilient bearing of polymer disposed in said housing, a ball stud having a metallic spherical member rotatably supported by said bearing, and resilient metallic closure means having a central depression and so secured as to close the second opening of said housing for applying pre-load to said bearing, said first opening having an annular surface slidably engaging one end of the spherical member, said depression having an annular surface slidably engaging the other end of the spherical member, the spherical member being elastically engaged and surrounded by said bearing between the annular surfaces whereby said annular surfaces support the spherical member when the ball joint is subjected to an external force in excess of the elastic limit of the bearing.

2. The ball joint as defined in claim 1, wherein said closure means comprises an inner closure plate having a central depression, an outer closure plate which is secured to the open end of the housing and which has a central depression carrying the central depression of the inner closure plate, the inner closure plate being at its annular opening edge of the depression in contact with the spherical member.

3. The ball joint as defined in claim 2, wherein the radius of the depression of the inner closure plate is less than that of the spherical member and is substantially equal to that of the depression of the outer closure plate.

* * * * *